(12) United States Patent
Lee (10) Patent No.: US 10,901,170 B2
(45) Date of Patent: Jan. 26, 2021

(54) IMAGE PROJECTION DEVICE

(71) Applicant: Qisda Corporation, Taoyuan (TW)

(72) Inventor: Chin-Kuei Lee, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/583,375

(22) Filed: Sep. 26, 2019

(65) Prior Publication Data

US 2020/0124819 A1 Apr. 23, 2020

(30) Foreign Application Priority Data

Sep. 28, 2018 (CN) .......................... 2018 1 1140310

(51) Int. Cl.
| | | |
|---|---|---|
| *G03B 21/14* | (2006.01) | |
| *G02B 7/04* | (2006.01) | |
| *G03B 3/10* | (2006.01) | |
| *G03B 13/34* | (2006.01) | |

(52) U.S. Cl.
CPC ................ *G02B 7/04* (2013.01); *G03B 3/10* (2013.01); *G03B 13/34* (2013.01); *G03B 21/142* (2013.01); *G03B 21/145* (2013.01)

(58) Field of Classification Search
CPC .... G03B 21/006; G03B 21/008; G03B 21/28; G03B 21/53; G03B 21/142; G03B 21/145; G03B 21/208; G03B 13/18; G03B 13/32; G03B 13/34; G02B 7/02; G02B 7/04; G02B 7/09; G02B 7/022; G02B 7/105
See application file for complete search history.

(56) References Cited

U.S. PATENT DOCUMENTS

| | | | | |
|---|---|---|---|---|
| 7,431,465 B2 * | 10/2008 | Ozaki | .................... | G02B 17/02 348/E5.143 |
| 2002/0118468 A1 * | 8/2002 | Shirota | .................... | G02B 7/10 359/699 |
| 2015/0378135 A1 | 12/2015 | Lee et al. | | |

FOREIGN PATENT DOCUMENTS

| | | |
|---|---|---|
| CN | 203311078 U | 11/2013 |
| CN | 105022221 A | 11/2015 |
| CN | 107015427 A | 8/2017 |
| JP | 2009186527 A | 8/2009 |
| JP | 2012226075 A | 11/2012 |

OTHER PUBLICATIONS

Office action of counterpart application by SIPO dated Jun. 9, 2020.

* cited by examiner

*Primary Examiner* — Sultan Chowdhury (57) ABSTRACT

According to one embodiment, an image projection device is provided. The image projection device includes an opto-mechanical module, a projection lens, and a lens adjusting mechanism. The opto-mechanical module is used for generating an image light. The projection lens is located on the path of the image light. The lens adjusting mechanism includes an outer ring rotating member, a transmission strip, a first fastener, and a driving mechanism. The outer ring rotating member is disposed on the projection lens, and the outer ring rotating member is used to drive the projection lens to rotate along an axis. The transmission strip surrounds the outer ring rotating member on the projection lens. The first fastener is fixedly connected to the transmission strip and the outer ring rotating member. The driving mechanism is connected to the transmission strip to drive the transmission strip and the outer ring rotating member to rotate.

20 Claims, 9 Drawing Sheets

IMAGE PROJECTION DEVICE

This application claims the benefit of People's Republic of China application Serial No. 201811140310.8, filed Sep. 28, 2018, the subject matter of which is incorporated herein by reference.

BACKGROUND OF THE INVENTION

Field of the Invention

The invention relates to an image projection device, and more particularly to an image projection device having a lens adjusting mechanism.

Description of the Related Art

Figure 1:
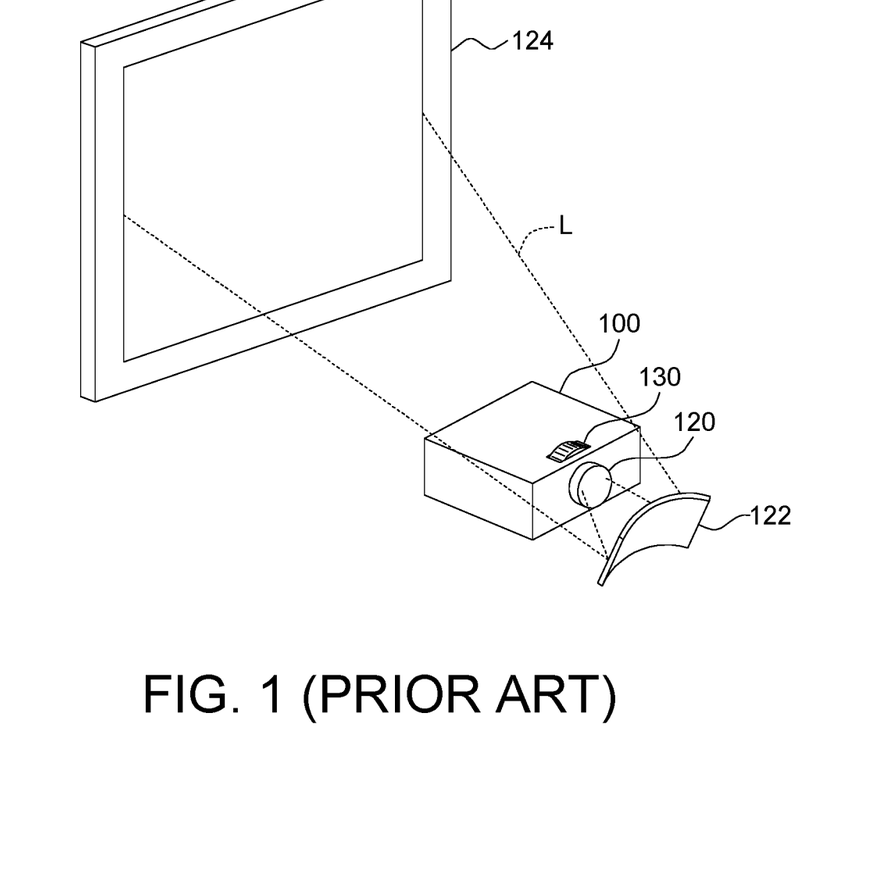
FIG. 1 (prior art) is a schematic diagram of a conventional reflective image projection device.

Referring to FIG. 1, the reflective image projection device 100 mainly projects the image light L to the reflecting mirror 122 via the projection lens 120, and then reflects and projects the image light L to the rear projection screen 124 via the reflecting mirror 122. The disadvantage of the reflective image projection device 100 relative to a front projection image projection device is that the focusing mechanism 130 is located above the projection lens 120, so that the user's hand will block the reflected image light L at the focusing process, which influences the user to watch the image on the projection screen 124 and to judge the condition of focusing. Therefore, the method of focusing by locating a focusing mechanism 130 above the projection lens 120 directly in convention needs further improvement.

SUMMARY OF THE INVENTION

The invention is directed to an image projection device capable of resolving the abovementioned focusing problems.

According to one embodiment of the present invention, an image projection device is provided. The image projection device includes an opto-mechanical module, a projection lens, and a lens adjusting mechanism. The opto-mechanical module is used for generating an image light. The projection lens is located on the path of the image light. The lens adjusting mechanism includes an outer ring rotating member, a transmission strip, a first fastener, and a driving mechanism. The outer ring rotating member is disposed on the projection lens, and the outer ring rotating member is used to drive the projection lens to rotate along an axis. The transmission strip surrounds the outer ring rotating member on the projection lens. The first fastener is fixedly connected to the transmission strip and the outer ring rotating member. The driving mechanism is connected to the transmission strip to drive the transmission strip and the outer ring rotating member to rotate.

Understood with regard to the following detailed description of the preferred but non-limiting embodiment(s). The following description is made with reference to the accompanying drawings.

DETAILED DESCRIPTION OF THE INVENTION

Embodiments are described in detail below. The embodiments serve as examples for illustrations and are not to be construed as limitations to the claimed scope of the present invention. The same/similar denotations are used below to represent the same/similar components. The directional terms mentioned in the following embodiments, for example: up, down, left, right, front or back, etc., are only referring to the directions of the drawings. Therefore, the directional terminology is used to illustrate but not used to limit the present invention.

Figure 2:
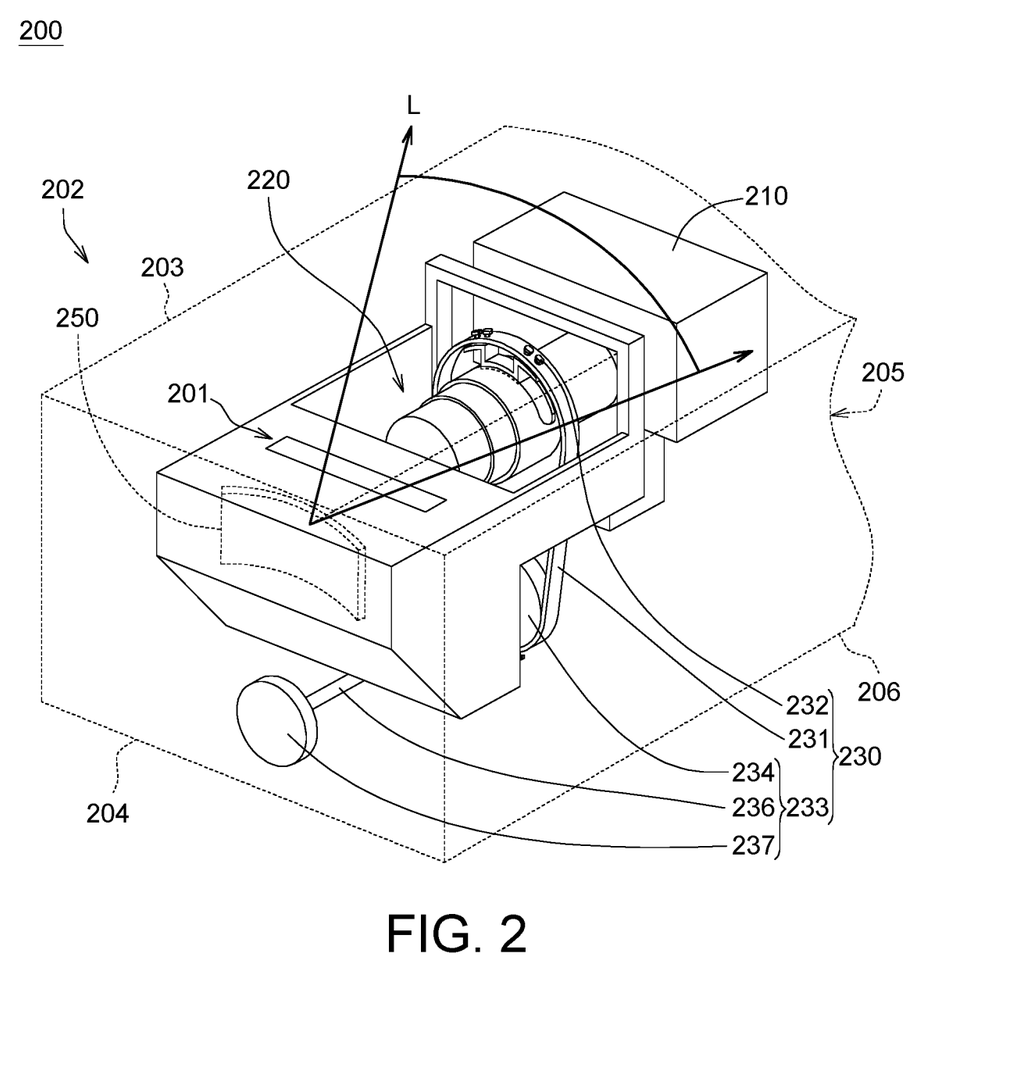
FIG. 2 is a schematic diagram of an image projection device according to an embodiment of the present invention.

According to an embodiment of present application, an image projection device, such as a reflective projector, is provided. Referring to FIG. 2, the image projection device 200 includes an opto-mechanical module 210, a projection lens 220, a lens adjusting mechanism 230, and a reflecting mirror 250. The opto-mechanical module 210 is used to generate an image light L, the projection lens 220 and the reflecting mirror 250 are located on the path of the image light L, and the reflecting mirror 250 faces the rear projection screen (not shown). The image projection device 200 mainly projects the image light L to the reflecting mirror 250 via the projection lens 220, and then reflects and projects the image light L to the rear projection screen via the reflecting mirror 250 to generate an image.

The opto-mechanical module 210 includes a light source (not shown) and at least one optical element (not shown). The light source for example is a light-emitting diode, a laser diode, a metal halide bulb, an UHE bulb or an UHP bulb, which are light-emitting elements suitable for illumination or optical projection. In addition, the light emitted from the light-emitting element may be adjusted by the optical element which may include a collimating lens, a beam homogenizer (such as lens array, integration rod), a filter device (e.g., a color wheel, a color filter), a beam splitter, a total internal reflection (TIR) prism, a digital micro-mirror device (DMD), a lens having diopter (e.g., field lens), or other optical elements which may adjust the light L of the light-emitting element.

Figure 3A:
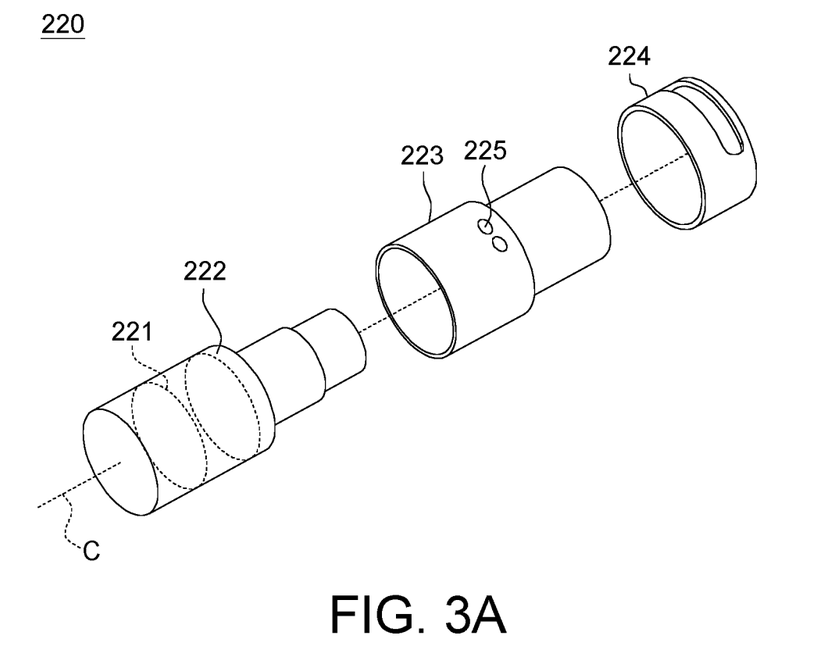
FIGS. 3A and 3B respectively are an explosion schematic diagram and an assembly schematic diagram of a projection lens according to an embodiment of the present invention.
Figure 3B:
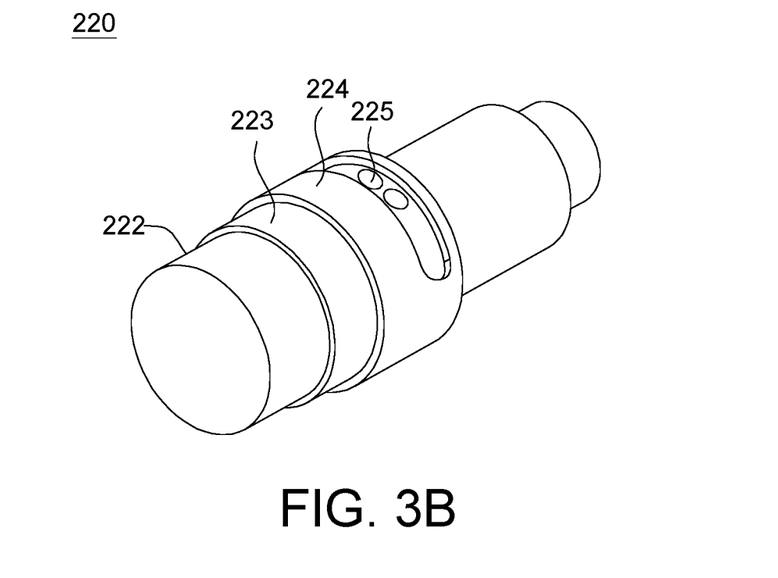

Referring to FIGS. 3A and 3B, the projection lens 220 for example includes multiple lens 221, a lens tube body 222, a casing 223, and an outer ring rotating member (e.g., a cam barrel) 224. The lens 221 is accommodated within the lens tube body 222, the lens tube body 222 can be rotatably set in the casing 223, and the outer ring rotating member 224 is set on the casing 223 and connected to casing 223 by a locking member (not shown) passing through the penetrating hole 225. The outer ring rotating member 224 can be used as a member of the lens adjusting mechanism 230 for driving the lens tube body 222 of the projection lens 220 to move and rotate along the axis C.

Figure 4A:
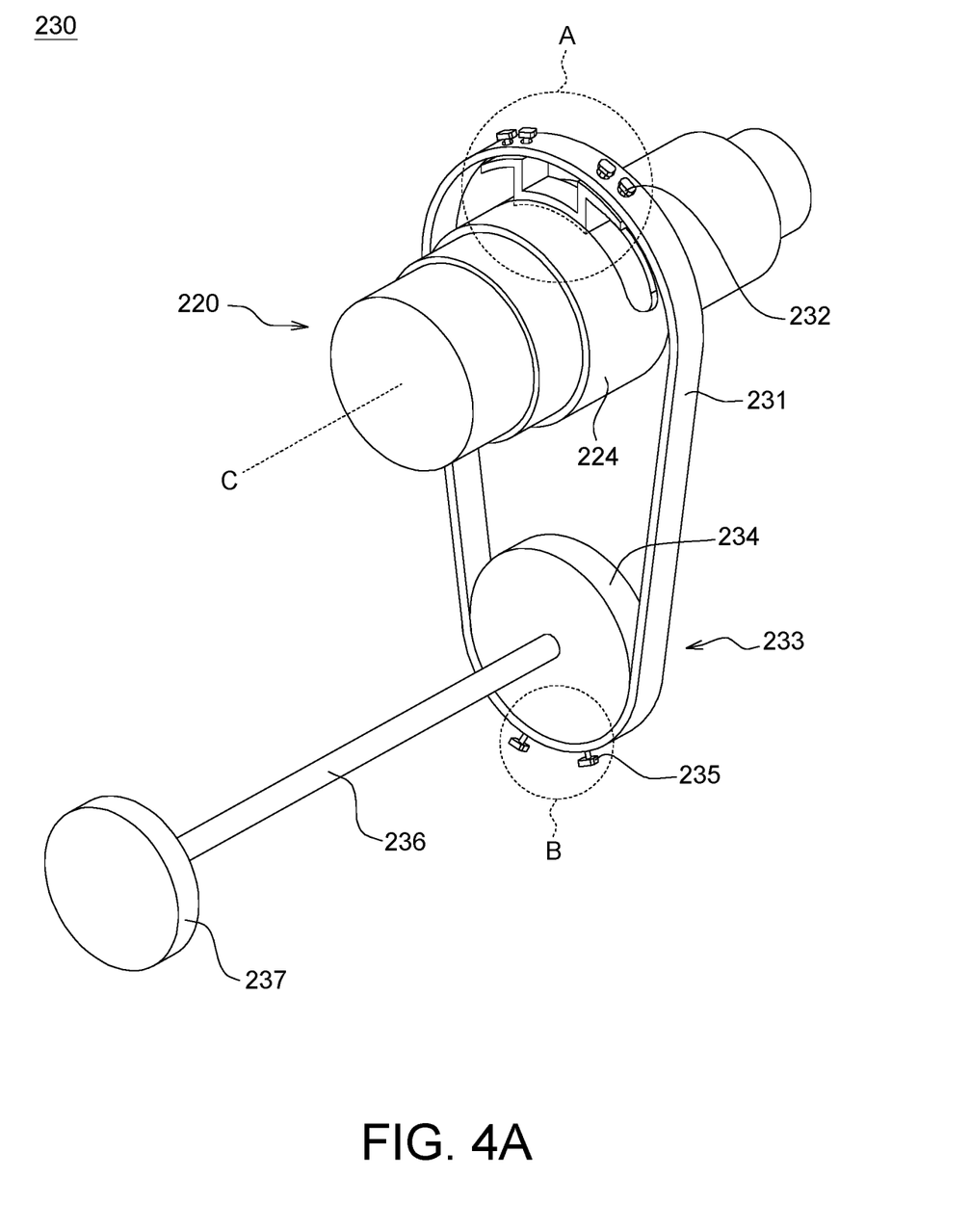
FIG. 4A is a schematic diagram of a lens adjusting mechanism according to an embodiment of the present invention.
Figure 4B:
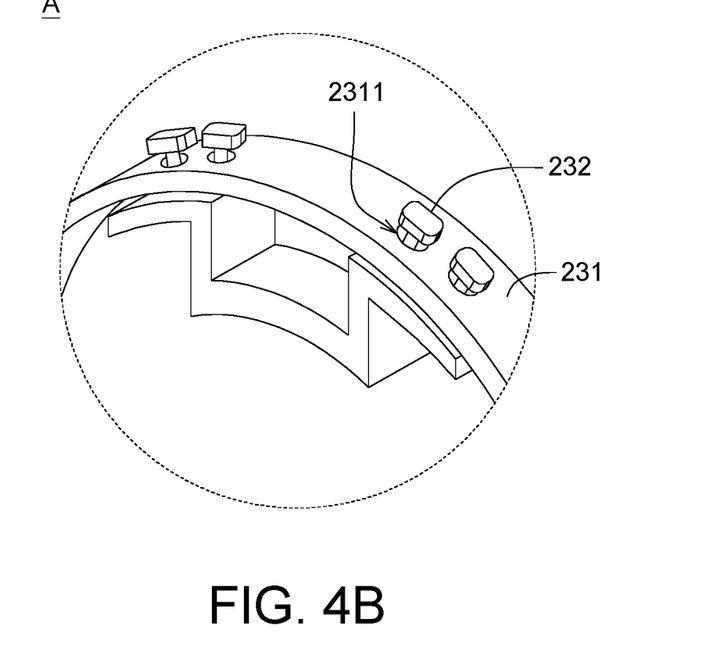
FIG. 4B is a partial enlarged schematic diagram of a region A of a transmission strip.
Figure 4C:
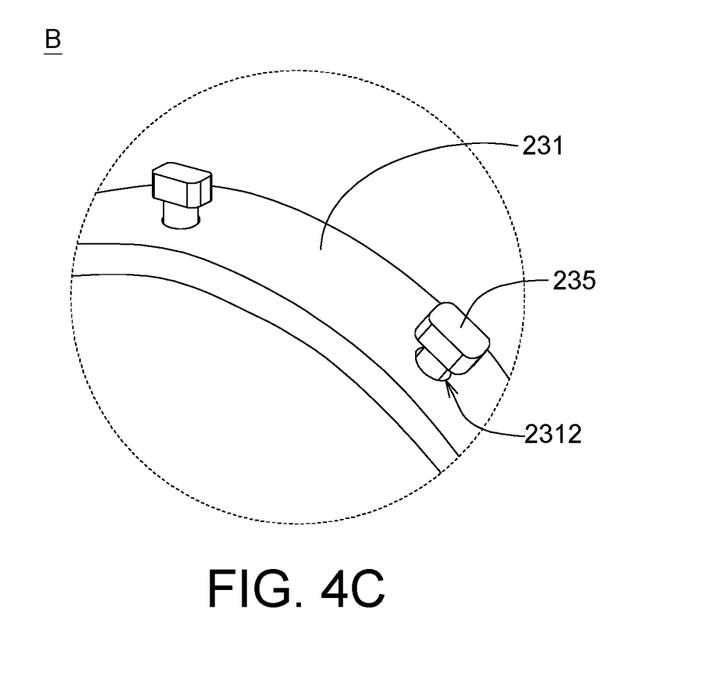
FIG. 4C is a partial enlarged schematic diagram of a region B of a transmission strip.

Referring to FIGS. 4A to 4C, in an embodiment, the lens adjusting mechanism 230 includes the outer ring rotating member 224, a transmission strip 231, a first fastener 232, and a driving mechanism 233. The outer ring rotating member 224 is disposed on the projection lens 220. The transmission strip 231 for example is a soft rubber belt, a metal transmitting belt, a steel sheet transmitting conveyor, or a chain, etc., and the present application is not limited thereto. In an embodiment, the inner surface of the transmission strip 231 has convex teeth, and the covex teeth can be engaged with corresponding teeth of the outer surface of the outer ring rotating member 224, or may be engaged with the outer ring rotating member 224 by a linkage structure, a screw, a rivet, etc.

Referring to FIG. 4B, the transmission strip 231 surrounds the outer ring rotating member 224, and the first fastener 232 can penetrate a through-hole 2311 of the transmission strip 231, and fix and connect the transmission strip 231 and the outer ring rotating member 224, to make the transmission strip 231 and the outer ring rotating member 224 remain fixed and can be rotated synchronously.

In an embodiment, the first fastener 232 for example is a chucking fastener, a locking member, or a rivet fixing member. However, the first fastener 232 is not limited to the type shown in the drawing of the present embodiment.

Referring to FIGS. 4A and 4C, the driving mechanism 233 for example includes a first driving wheel 234 and a second fastener 235. The transmission strip 231 can surround the first driving wheel 234, and the second fastener 235 can penetrate a through-hole 2312 of the transmission strip 231, and fixedly connect the transmission strip 231 and the first driving wheel 234, to make the transmission strip 231 and the first driving wheel 234 remain fixed and can be rotated synchronously. As the first fastener 232 stated above, the inner surface of the transmission strip 231 has convex teeth, and the convex teeth can be engaged with corresponding teeth of the outer surface of the first driving wheel 234, or may be engaged with the first driving wheel 234 by a linkage structure, a screw, a rivet, etc.

In an embodiment, the second fastener 235 for example is a chucking fastener, a locking member, or a rivet fixing member. However, the second fastener 235 is not limited to the type shown in the drawing of the present embodiment.

In addition, referring to FIG. 4A, the driving mechanism 233 for example includes a rotating shaft 236. The rotating shaft 236 can be connected to a second driving wheel 237 or a motor (not shown). The second driving wheel 237 or the motor can control the rotation of the rotating shaft 236, to achieve an electric or manual control. Therefore, the user can control the rotation of the first driving wheel 234 connected to the rotating shaft 236 by driving the second driving wheel 237 or the motor to rotate, and the purpose of adjusting the focusing of the projection lens 220 can be achieved.

Figure 5A:
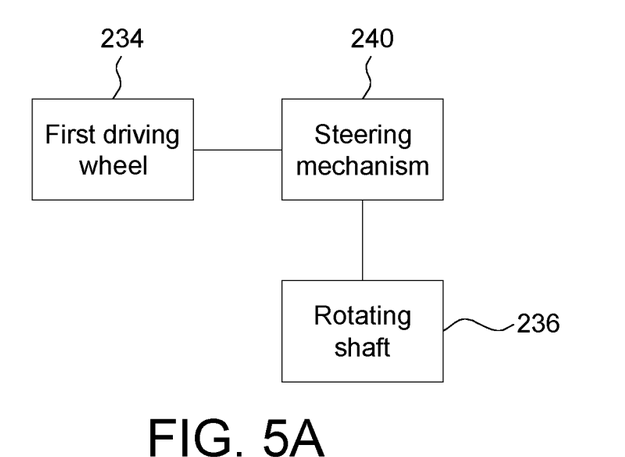
FIG. 5A is a configuration schematic diagram of a steering mechanism according to an embodiment of the present invention.

In an embodiment, the first driving wheel 234 and the second driving wheel 237 for example is coaxially disposed on the two ends of the rotating shaft 236, so that the rotating shaft 236 is configured substantially parallel to the axis C on which the projection lens 220 moves. That is, the rotating shaft 236 and the axis C on which the projection lens 220 moves are in the same orientation and parallel to each other, but not in the same line. On another aspect, when the rotating shaft 236 and the axis C on which the projection lens 220 moves are on different orientation, for example, when the rotating shaft 236 and the axis C on which the projection lens 220 moves are configured perpendicularly, a steering mechanism 240 for example is disposed between the first driving wheel 234 and the rotating shaft 236 (as shown in FIG. 5A), so that the rotating shaft 236 is connected to the first driving wheel 234 by the steering mechanism 240. The steering mechanism for example is a gear set or other linkage structure.

In an embodiment, the transmission strip 231 for example has a first rotating radius at the upper end, the transmission strip 231 for example has a second rotating radius at the lower end, the first rotating radius can be greater than, less than, or equal to the second rotating radius, and the focusing accuracy of the projection lens 220 can be adjusted by changing the rotating radius based on the requirement of the user. As such, the operation feeling may be better, and the rotating efficiency may be improved. In addition, by driving the projection lens 220 through the belt directly, the hysteresis which is caused by setting other transmission mechanism can be avoided.

Figure 5B:
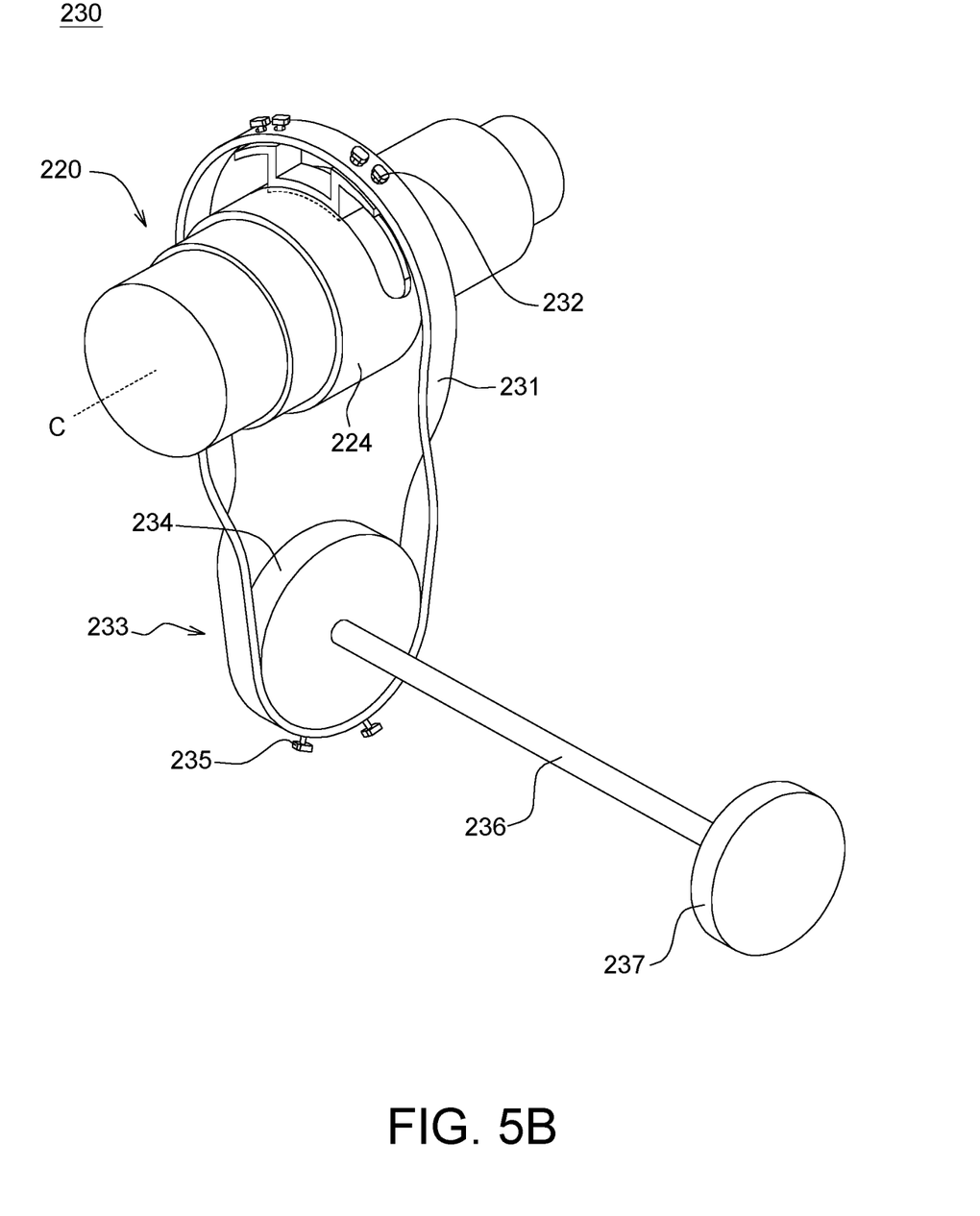
FIG. 5B is a schematic diagram of a lens adjusting mechanism according to another embodiment of the present invention.

In addition, referring to FIG. 5B, since the transmission strip 231 can be deformed and driven, the first driving wheel 234, the rotating shaft 236, and the second driving wheel 237 can be steered via the twisted belt 231 and be disposed perpendicular to the axis C on which the projection lens 220 moves, without setting the steering mechanism 240 in FIG. 5A.

As shown is FIG. 2, the image projection device 200 includes a casing 202, used to accommodate the opto-mechanical module 210, the projection lens 220, the reflecting mirror 250, and the lens adjusting mechanism 230. The casing 202 has a first surface 203, a second surface 204, and a third surface 205. The first surface 203 and the second surface 204 are two adjacent surfaces, the second surface 204 and the third surface 205 are two opposite surfaces, and the first surface 203 has an opening 201 (or the opening 201 faces the first surface 203). The opto-mechanical module 210 is located in the casing 202 and emits an image light L toward the second surface 204, and the image light L is reflected to the opening 201 of the first surface 203 via the reflecting mirror 250, and is emitted outside the casing 202.

In an embodiment, the second driving wheel 237 can be disposed on the second surface 204 of the casing 202, and the position of the second driving wheel 237 is located relatively under the projection lens 220, for the user to hold and rotate. That is, the second driving wheel 237 is farther from the opening 201 of the first surface 203 relative to the projection lens 220. Therefore, the reflected image light L will not be blocked by the hands of the user during the focusing process, so that the user can clearly watch the image on the projection screen and judge the condition of focusing.

Although it is not shown, in another embodiment, the second driving wheel 237 for example is disposed on the third surface 205 (a surface opposite to the second surface 204) of the casing 202, and the position of the second driving wheel 237 is relatively far from the opening 201 of the first surface 203 (i.e., relatively far from the light outputting direction of the reflected light L). Therefore, the reflected image light L will not be blocked by the hands of the user during the focusing process, so that the user can clearly watch the image on the projection screen and judge the condition of focusing.

In another aspect, when the steering mechanism 240 shown in FIG. 5A or the twisted strip 231 shown in FIG. 5B is disposed internally in the casing 202, the second driving wheel 237 can be disposed on a side 206 (the left surface or the right surface adjacent to the second surface 204) of the housing 202 for the user to hold and rotate. Therefore, the reflected image light L will not be blocked by the hands of the user during the focusing process, so that the user can clearly watch the image on the projection screen and judge the condition of focusing.

Figure 6:
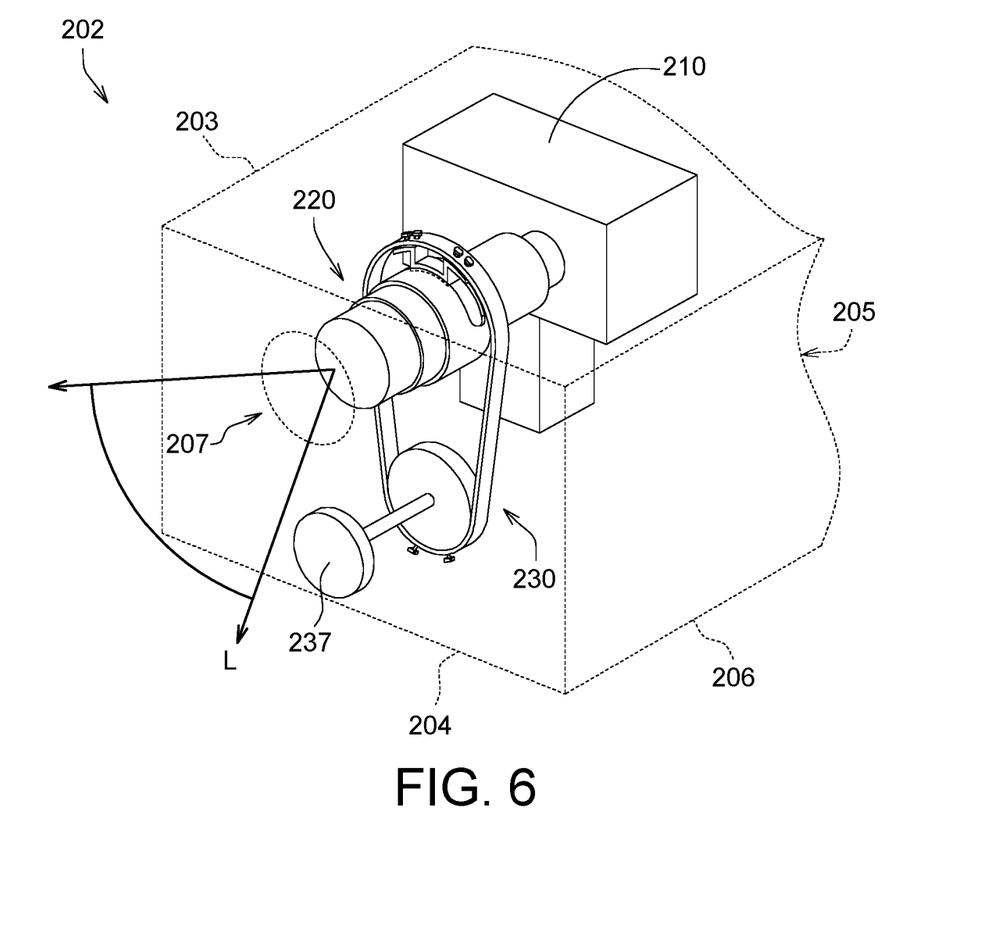
FIG. 6 is a schematic diagram of an image projection device according to another embodiment of the present invention.

Referring to FIG. 6, an image projection device 200 is provided according to an embodiment of the present invention, and the image projection device 200 for example is a front projection projector. The difference between this embodiment and the above embodiment is that the image light L is directly projected through the opening 207 (located on the second surface 204) in front of the projection lens 220 and does not need to be reflected by the reflecting mirror 250 described above. Through the lens adjusting mechanism 230 of the present embodiment, the user can focus by holding and rotating the second driving wheel 237, and it is not limited to only being able to set a focusing mechanism above the projection lens 220. The second driving wheel 237 is farther from the first surface 203 relative to the projection lens 220. For an explanation of the opto-mechanical module 210, the projection lens 220 and the lens adjusting mechanism 230, please refer to the above embodiment. The same/similar denotations are used below to represent the same/similar components, which will not be repeated here.

Figure 7A:
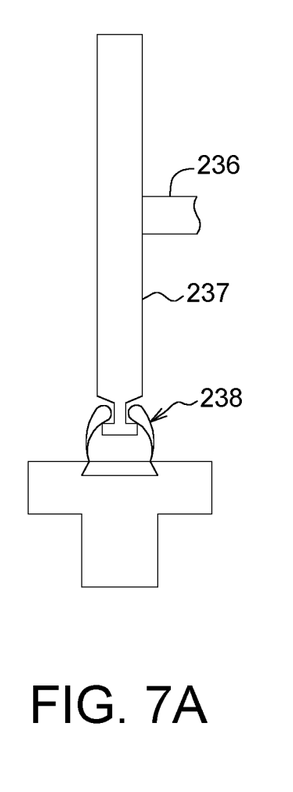
FIGS. 7A and 7B respectively are a schematic diagram of a positioning structure according to an embodiment of the present invention.
Figure 7B:
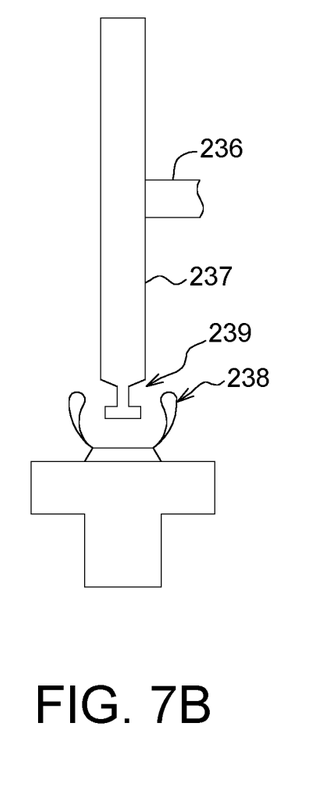

Referring to FIGS. 7A and 7B, the image projection device 200 in the above embodiment can further comprise a positioning structure 238 according to an embodiment of the present invention. The positioning structure 238 for example is disposed on a side of the second driving wheel 237 to fasten the second driving wheel 237 and to make the second driving wheel 237 unable to rotate. In an embodiment, the positioning structure 238 is, for example, two chuck fixing members or two elastic fasteners with opening and closing functions, and two slots 239 or two clamping holes are disposed on the second driving wheel 237 correspondingly, so that the positioning structure 238 can chuck the two opposite sides of the second driving wheel 237 and the second driving wheel 237 cannot be rotated.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image projection device, comprising:
    an opto-mechanical module for generating an image light;
    a projection lens located on a path of the image light; and
    a lens adjusting mechanism, comprising:
        an outer ring rotating member disposed on the projection lens, and the outer ring rotating member being used to drive the projection lens to move and rotate along an axis;
        a transmission strip surrounding the outer ring rotating member on the projection lens;
        a first fastener fixedly connected to the transmission strip and the outer ring rotating member; and
        a driving mechanism connected to the transmission strip to drive the transmission strip and the outer ring rotating member to rotate.

2. The image projection device of claim 1, wherein the driving mechanism comprises a first driving wheel and a second fastener, the transmission strip surrounds the first driving wheel, and the second fastener fixedly connects the transmission strip and the first driving wheel.

3. The image projection device of claim 2, wherein the driving mechanism further comprises a second driving wheel and a rotating shaft, and the second driving wheel is connected to the first driving wheel via the rotating shaft.

4. The image projection device of claim 3, wherein the first driving wheel and the second driving wheel are coaxially disposed on two ends of the rotating shaft.

5. The image projection device of claim 3, wherein the rotating shaft is configured parallel to the axis on which the projection lens moves.

6. The image projection device of claim 3, wherein a steering mechanism is disposed between the first driving wheel and the rotating shaft, so that the rotating shaft and the axis on which the projection lens moves are configured perpendicularly.

7. The image projection device of claim 3, wherein the rotating shaft is steered via the transmission strip being twisted, so that the rotating shaft and the axis on which the projection lens moves are configured perpendicularly.

8. The image projection device of claim 3, further comprising a casing for accommodating the opto-mechanical module, the projection lens, a reflecting mirror, and the lens adjusting mechanism, wherein the casing has a first surface, a second surface and a side, the first surface and the second surface are two adjacent surfaces, the second surface and the side are two adjacent surfaces, and the first surface has an opening,
    wherein the second driving wheel is disposed on the second surface or the side, the opto-mechanical module makes the image light being emitted toward the second surface and reflected to the opening via the reflecting mirror, and the second driving wheel is farther from the opening of the first surface relative to the projection lens.

9. The image projection device of claim 3, further comprising a casing for accommodating the opto-mechanical module, the projection lens, and the lens adjusting mechanism, wherein the casing has a first surface, a second surface and a side, the first surface and the second surface are two adjacent surfaces, the second surface and the side are two adjacent surfaces, and the second surface has an opening,
    wherein the second driving wheel is disposed on the second surface or the side, the opto-mechanical module makes the image light being emitted toward the second surface and projected through the opening, and the second driving wheel is farther from the first surface relative to the projection lens.

10. The image projection device of claim 3, further comprising a positioning structure disposed on a side of the second driving wheel to fasten the second driving wheel and to make the second driving wheel unable to rotate.

11. The image projection device of claim 10, wherein the positioning structure is two chuck fixing members or two elastic fasteners with opening and closing functions, and two slots or two clamping holes are disposed on the second driving wheel correspondingly, so that the positioning structure chuck the two opposite sides of the second driving wheel to make the second driving wheel unable to rotate.

12. The image projection device of claim 1, wherein the opto-mechanical module includes a light source and at least one optical element, and the image light emitted from the light source is adjusted by the at least one optical element.

13. The image projection device of claim 1, wherein the projection lens comprises a plurality of lens, a lens tube body, and a casing, and the lens is accommodated within the lens tube body, the lens tube body is rotatably set in the casing, and the outer ring rotating member is set on the casing and connected to the casing by a locking member.

14. The image projection device of claim 1, wherein the transmission strip has a first rotating radius at an upper end, the transmission strip has a second rotating radius at a lower end, and the first rotating radius is greater than the second rotating radius.

15. The image projection device of claim 2, wherein the driving mechanism further comprises a motor and a rotating shaft, and the motor is driven to control rotation of the first driving wheel connected to the rotating shaft.

16. An image projection device, comprising:
an opto-mechanical module for generating an image light;
a projection lens and a reflecting mirror located on a path of the image light, wherein the image light is projected to the reflecting mirror via the projection lens; and
a lens adjusting mechanism, comprising:
an outer ring rotating member disposed on the projection lens, and the outer ring rotating member being used to drive the projection lens to move and rotate along an axis;
a transmission strip surrounding the outer ring rotating member on the projection lens;
a first fastener fixedly connected to the transmission strip and the outer ring rotating member; and
a driving mechanism connected to the transmission strip to drive the transmission strip and the outer ring rotating member to rotate.

17. The image projection device of claim 16, wherein the rotating shaft is configured parallel to the axis on which the projection lens moves.

18. The image projection device of claim 16, wherein a steering mechanism is disposed between the driving mechanism and the rotating shaft, so that the rotating shaft and the axis on which the projection lens moves are configured perpendicularly.

19. The image projection device of claim 16, wherein the rotating shaft is steered via the transmission strip being twisted, so that the rotating shaft and the axis on which the projection lens moves are configured perpendicularly.

20. The image projection device of claim 16, further comprising a casing for accommodating the opto-mechanical module, the projection lens, and the reflecting mirror, wherein the casing has an opening corresponding to the reflecting mirror, and the image light is reflected to the opening via the reflecting mirror.

* * * * *